J. Partridge,
Horse Rake.
No. 43,702.   Patented Aug. 2, 1864.
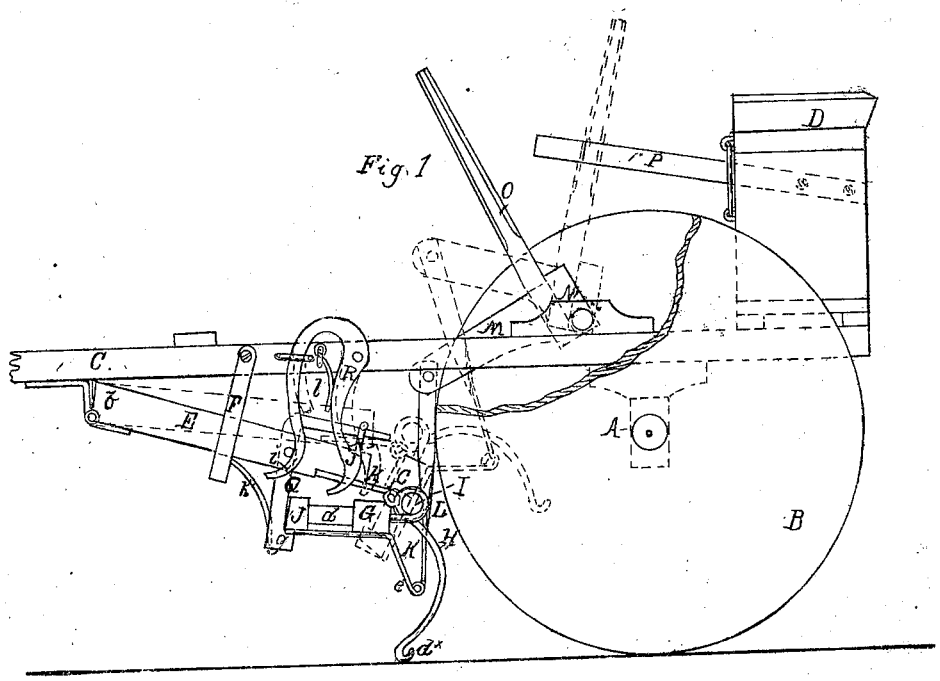
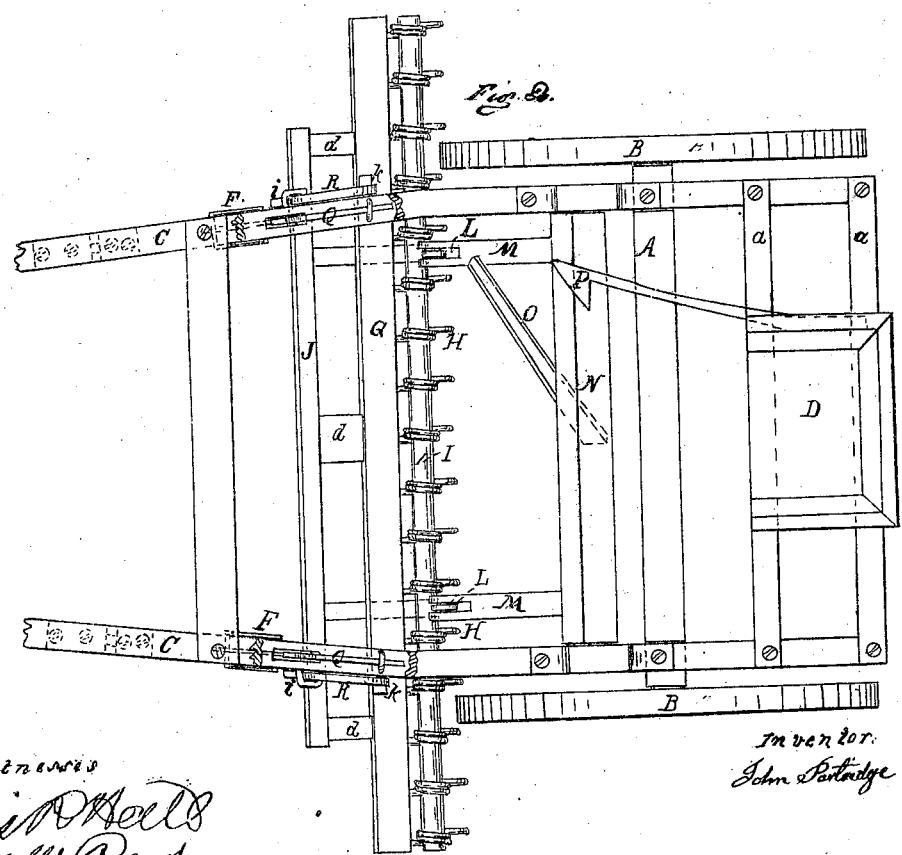
Witnesses
Inventor
John Partridge

UNITED STATES PATENT OFFICE.

JOHN PARTRIDGE, OF PITTSFIELD, MASSACHUSETTS.

IMPROVEMENT IN HORSE-RAKES.

Specification forming part of Letters Patent No. 43,702, dated August 2, 1864.

*To all whom it may concern:*

Be it known that I, JOHN PARTRIDGE, of Pittsfield, in the county of Berkshire and State of Massachusetts, have invented a new and Improved Horse-Rake; and I do hereby declare that the following is a full, clear, and exact description of the same, reference being had to the accompanying drawings, making a part of this specification, in which—

Figure 1 is a side view of my invention; Fig. 2, a plan or top view of the same.

Similar letters of reference in both figures indicate corresponding parts.

This invention consists in a novel manner of arranging and applying the rake to the mounted framing of the device, as hereinafter fully shown and described, whereby the rake is allowed to conform—that is to say, rise and fall to accommodate itself—to the irregularities of surface over which it may pass while performing its work, and at the same time be capable of being operated with the greatest facility in order to discharge its load and pass over obstructions, &c.

To enable those skilled in the art to fully understand and construct my invention, I will proceed to describe it.

A represents an axle, and B B its wheels.

C C are thills attached to the axle, extending back thereof, and connected by cross-bars $a$ to form a framing, on which the driver's seat D is placed.

To each thill C, at its under side, there is attached, by a hinge or joint, $b$, a bar, E. These bars are in front of the wheels B B, and they work in or pass through pendent guides F F attached to the thills.

To the back ends of the bars E E a rake-head, G, is connected by joints or hinges $c\,c$.

The teeth H of the rake are constructed of wire bent or curved in the usual form and wound around a rod, I, at their upper ends before passing into the rake-head, the rod I being at the rear of the rake-head. At the front of the rake-head there is connected, by arms $d$, a bar, J, the latter being parallel with the rake-head and at a short distance in front of it. The lower ends of the teeth H, I design to have curved, as shown at $d^\times$ in Fig. 1, to prevent them from catching into the ground as the machine is drawn along.

The rake-head G is provided with two inclined pendent bars, K K, which are connected by joints $e\,e$ to arms L L, the latter having their upper ends attached by pivots $f$ to arms M M of a rock-shaft N, which has a handle or lever, O, secured to it, said lever being within convenient reach of the driver on the seat D. A catch, P, is attached to one side of the seat D to hold the lever O back when desired, as represented in red outline in Fig. 1.

In the inner part of each bar E there is fitted a bent lever, Q, the lower ends of which are provided with shoulders $g$ to catch under the bar J, each lever Q having a spring, $h$, bearing against its lower end, which springs have a tendency to throw the shoulders $g$ under bar J, as shown in Fig. 1.

To the outer side of each thill C there is attached a curved lever, R, both ends of which extend down to the lower edges of the bars, as shown clearly in Fig. 1. The front end, $i$, of each lever R is of taper form and curved slightly forward, the back ends being provided with shoulders $j$ to catch under pins $k$, which project laterally from the back end of each bar E. Each lever R has a spring, $l$, bearing against it, and these springs have a tendency to throw the shoulders $j$ underneath the pins $k$. (See Fig. 1.)

The operation is as follows: When the implement is being drawn along and the rake is at work the pins $k\,k$ at the back ends of the bars E are free from and below the shoulders $j$ of the levers R, the bar J bearing upon the shoulders $g$ at the lower ends of said levers and retaining the rake in a proper working position. The rake is allowed a rising-and-falling movement in order that it may accommodate itself to the undulations of the ground in consequence of the bars E E being attached by hinges to the thills. In order to discharge the load, the driver draws back the lever O, which causes the rock-shaft N to be turned, and the arms L M draw up the rake-head G until the pins $k$ of the bars E catch over the shoulders $j$ of the levers R, which cause the rake to be held suspended, and at the same time the upper ends of the levers Q will strike against the thills and throw the shoulders $g$ out from bar J, and the lever O being still drawn back the rake is turned upward, as shown in red in Fig. 1, in consequence of the rake-head G being attached by hinges $c$ to the bars E. Thus it will be seen by the movement of a single lever, O, the rake may be turned with a movement well calculated to cause its load to be freely discharged. The rake may be operated with a very slight effort on the part of the driver, and the latter may have perfect control over both the horse and the implement, and his attention is not closely confined to the operating of the rake. When the driver liberates the lever O the rake falls by virtue of its own gravity, and the bar J, in turning upward, strikes the front ends, $i$, of the levers R and throws the shoulders $j$ outward from underneath the pins $k$, so that the rake may assume its working position.

Having thus described my invention, what I claim as new, and desire to secure by Letters Patent, is—

The attaching of the rake-head G by hinges $c$ to bars E, which are connected to the thills C C by hinges $b$, in combination with the levers Q R, provided respectively with the shoulders $gj$ to sustain the bar J and the bars E E, all arranged, in connection with the arms L M and rock-shaft N, to operate substantially as and for the purpose set forth.

JOHN PARTRIDGE.

Witnesses:
JAS. P. HALL,
GEO. W. REED.